(12) United States Patent
Ingram

(10) Patent No.: US 6,602,065 B1
(45) Date of Patent: Aug. 5, 2003

(54) APPARATUS FOR COMPRESSION MOLDING PLASTIC CLOSURES

(75) Inventor: Keith W. Ingram, Holland, OH (US)

(73) Assignee: Owens-Illinois Closure Inc., Toledo, OH (US)

( * ) Notice: Subject to any disclaimer, the term of this patent is extended or adjusted under 35 U.S.C. 154(b) by 373 days.

(21) Appl. No.: 09/643,593

(22) Filed: Aug. 22, 2000

(51) Int. Cl.⁷ .............................. B29C 43/50
(52) U.S. Cl. .................. 425/350; 425/351; 425/418; 425/422; 425/438; 425/809; 425/DIG. 58
(58) Field of Search .................. 425/350, 351, 425/414, 418, 422, 438, 809, DIG. 58; 249/59

(56) References Cited

U.S. PATENT DOCUMENTS

| | | | |
|---|---|---|---|
| 1,944,571 A | * | 1/1934 | Rahm .................... 425/351 |
| 2,295,220 A | * | 9/1942 | Kaula .................... 425/418 |
| 2,404,631 A | * | 7/1946 | Gronemeyer ............ 425/438 |
| 2,513,216 A | * | 6/1950 | Sullivan et al. ......... 425/349 |
| 3,156,008 A | | 11/1964 | Martin |
| 3,905,416 A | | 9/1975 | Hammer |
| 4,139,176 A | | 2/1979 | Wündsch |
| 4,776,782 A | | 10/1988 | Murayama et al. |
| 4,958,676 A | | 9/1990 | Kuntz |
| 4,959,007 A | | 9/1990 | Okuyama |
| 5,135,700 A | | 8/1992 | Williams et al. |
| 5,281,385 A | | 1/1994 | Julian |
| 5,554,327 A | | 9/1996 | Ingram et al. |
| 5,670,100 A | | 9/1997 | Ingram |
| 5,770,130 A | | 6/1998 | Ingram et al. |
| 6,074,583 A | | 6/2000 | Ingram |

FOREIGN PATENT DOCUMENTS

| | | |
|---|---|---|
| EP | 00903212 | 3/1999 |
| WO | 0185419 | 11/2001 |

* cited by examiner

Primary Examiner—James P. Mackey
Assistant Examiner—Donald Heckenberg

(57) ABSTRACT

Apparatus for compression molding plastic closures having a peripheral skirt with an internal thread includes a first mold assembly having a male mold core and a second mold assembly having a female mold cavity. At least one of the first and second mold assemblies is moved relative to the other to bring the male mold core into the female mold cavity for compression molding a closure, and then is moved to open the cavity such that the closure is retained on the male mold core. The male mold core is rotated relative to the first mold assembly to unthread the core from within the closure, and thereby strip the closure from the core, without stretching the closure skirt over the core or wiping the internal thread over the external surface of the mold core.

10 Claims, 8 Drawing Sheets

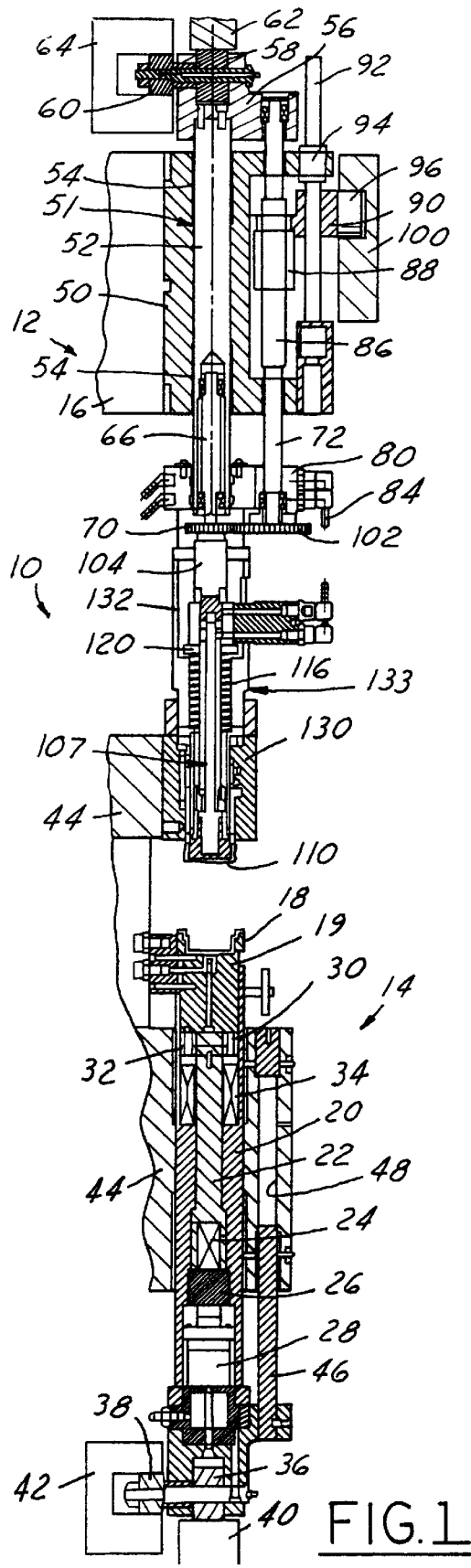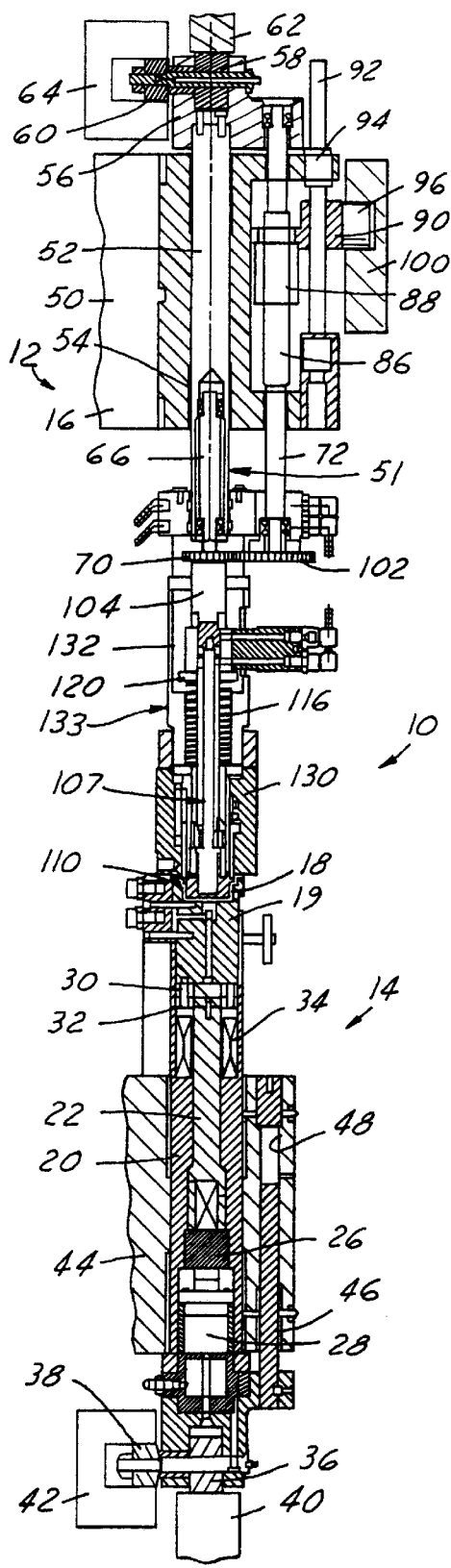

APPARATUS FOR COMPRESSION MOLDING PLASTIC CLOSURES

The present invention is directed to an apparatus and method for compression molding plastic closures having a peripheral skirt with an internal thread, and more particularly to an apparatus and method for stripping the closure from a male mold core by rotating the core so as to unthread the closure.

BACKGROUND AND OBJECTS OF THE INVENTION

U.S. Pat. Nos. 5,554,327, 5,670,100 and 6,074,583, assigned to the assignee of the present application, disclose apparatuses and methods for compression molding plastic articles such as plastic closures. A plurality of male and female mold assemblies are mounted on a turret in opposed circumferential arrays. The assemblies are coupled to fixed cams for movement into engagement with each other to form a mold cavity and compression mold a plastic charge into a closure, and then to move the assemblies axially away from each other to open the mold cavity. As the male mold assembly is retracted from the female mold assembly, the molded closure is stripped from the male mold core by a stripper sleeve that pushes the closure axially off of the core. The internal thread or threads on the closure skirt are thus wiped across the outer face of the mold core.

Although the arrangements disclosed in the noted patents have enjoyed substantial commercial acceptance and success, further improvements remain desirable. In particular, although the apparatuses and methods disclosed in the noted patents work well with relatively flexible and resilient thermoplastic materials such as polypropylene, they do not work as well as desired with thermosetting materials or with relatively stiff thermoplastic materials such as PET. When employing such materials, the closure cannot be axially stripped from the male mold core by expanding the closure skirt and wiping the threads across the radial surface of the core. The closure skirts are not sufficiently resilient for stripping by this technique, and the threads can become damaged. It is therefore a general object of the present invention to provide an apparatus and method for compression molding plastic closures that include facility for rotating the male mold core with respect to the outer holding member(s) for stripping the closure by unthreading the male mold core from within the closure. Another and more specific object of the invention is to provide an apparatus and method of the described character suitable for implementation in a continuously rotating molding apparatus of the type disclosed in above-noted U.S. Pat. Nos. 5,554,327, 5,670,100 and 6,074,583.

SUMMARY OF THE INVENTION

Apparatus for compression molding plastic closures having a peripheral skirt with an internal thread (or threads) in accordance with a presently preferred embodiment of the invention includes a first mold assembly having a male mold core and a second mold assembly having a female mold cavity. At least one of the first and second mold assemblies is moved relative to the other to bring the male mold core into the female mold cavity for compression molding a closure, and then is moved to open the cavity such that the closure is retained on the male mold core. The male mold core is rotated relative to the first mold assembly to unthread the core from within the closure, and thereby strip the closure from the core without stretching the closure skirt over the core or wiping the internal thread over the external surface of the mold core.

In the preferred embodiment of the invention, the first mold assembly includes a first shaft mechanism carried by a housing for rotary and axial movement, with the male mold core being coupled to the end of the first shaft mechanism. The male mold core is rotated by rotating the first shaft mechanism relative to the housing. The first shaft mechanism is mounted between axially spaced brackets, and a ballscrew shaft is rotatably carried by the brackets parallel to the first shaft mechanism. Drive gears rotatably couple the first shaft mechanism to the ballscrew shaft in the preferred embodiment of the invention, and a ballnut actuator is coupled to the ballscrew shaft for controlling rotation of the ballscrew shaft. In the preferred embodiment of the invention, the ballnut actuator is coupled to a fixed cam for controlling position of the ballnut actuator and rotation of the ballscrew shaft with axial motion of the first mold assembly. The contour of the cam controls the rate of rotation of the ballscrew shaft, the first shaft mechanism and the male mold core as the first mold assembly rises. A stripper sleeve on the first mold assembly engages the skirt of the closure and holds the closure against rotation as the mold core is rotated and retracted from the closure.

In accordance with another aspect of the present invention, a method of compression molding plastic closures contemplates provision of a first mold assembly having a male mold core and a second mold assembly having a female mold cavity. At least one of the first and second mold assemblies is moved with respect to the other to bring the male mold core into the female mold cavity for compression molding a closure, and the at least one mold assembly is then retracted from the other such that the mold cavity is opened and the closure is retained on the male mold core The closure is removed from the male mold core by rotating the male mold core with respect to the closure so as to unscrew the mold core from the closure. This is accomplished by mounting a ballscrew shaft on the first mold assembly parallel to a first shaft mechanism to which the male mold core is secured, rotatably coupling the ballscrew shaft to the first shaft mechanism and rotating the ballscrew shaft, preferably by means of a ballnut actuator. The ballnut actuator may be held in fixed position so that the ballscrew shaft, the first shaft mechanism and the male mold core are rotated in opposite directions as the male mold core is lowered and raised, or more preferably is coupled to a fixed cam for controlling rotation of the ballscrew shaft, first shaft mechanism and male mold core as a function of axial movement of the male mold core. In the preferred embodiment, a plurality of first and second mold assemblies are mounted on a rotating turret in such a way that each assembly pair executes a complete operating cycle in sequence with the remaining assembly pairs.

BRIEF DESCRIPTION OF THE DRAWINGS

The invention, together with additional objects, features and advantages thereof, will be best understood from the following description, the appended claims and the accompanying drawings in which:

FIG. 1 is a sectioned elevation view of apparatus for compression molding plastic closures in accordance with a presently preferred embodiment of the invention in a fully open condition;

FIG. 2 is a sectioned elevational view similar to that of FIG. 1 but showing the mold assemblies in the closed position;

DETAILED DESCRIPTION OF PREFERRED EMBODIMENTS

Figure 3:
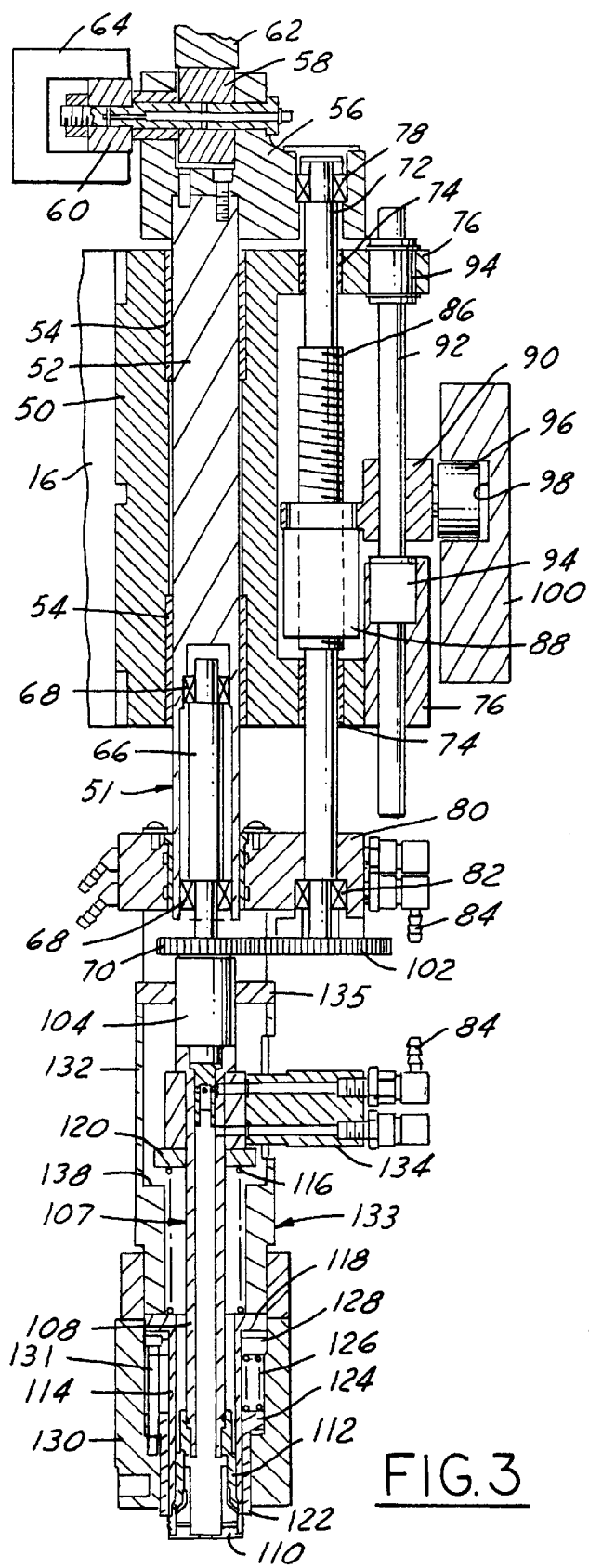
FIG. 3 is a sectioned view on an enlarged scale of the first or upper mold assembly in the embodiment of FIGS. 1 and 2.

The disclosures of U.S. Pat. Nos. 5,554,327, 5,670,100 and 6,074,583 are incorporated herein by reference.

The drawings illustrate an apparatus 10 for compression molding plastic closures in accordance with a presently preferred embodiment of the invention. A plurality of first or upper mold assemblies 12 and a plurality of second or lower mold assemblies 14 are mounted in axially opposed circumferential arrays on a rotatable turret 16. In lower or second mold assembly 14, a female mold cavity 18 is mounted on tooling 19 at the upper end of a tooling actuator 20. A plunger 22 is slidably mounted within actuator 20, being urged upwardly by a coil spring 24. Spring 24 is captured in compression within the lower end of plunger 22 by means of a plug 26 sliding within actuator 20. A nitrogen cylinder 28 is mounted within actuator 20, with a piston in engagement with the lower face of plug 26. A plurality of lift pins 30 are mounted on a lift pin retainer 32 at the upper end of actuator 20, and are biased upwardly by a plurality of coil springs 34 captured within actuator 20. A pair of cam rollers 36, 38 are carried at the lower end of actuator 20, and engage respective fixed cams 40, 42 that are carried in fixed position on a turret frame. Actuator 20 is slidably mounted in a support body 44 that is mounted on turret 16, and vertical motion under control of cams 40, 42 is guided by a rod 46 slidably received in a bore 48 within support body 44. Rod 46 and bore 48 prevent rotation of actuator 20 about its axis. Second or lower mold assembly 14 is substantially the same as that disclosed in above-referenced U.S. Pat. No. 5,554,327.

First or upper mold assembly 12 includes an upper bracket or support body 50 secured to turret 16 in axial overlying alignment with lower support body 44. A first or actuator shaft mechanism or assembly 51 includes a first shaft 52 slidably mounted within body 50 by spaced linear bearings 54. The upper end of actuator shaft 52 is connected to an upper actuator bracket 56. A pair of cam rollers 58, 60 are mounted on upper actuator bracket 56 for engagement with respective fixed cams 62,64 carried by the turret frame. Shaft mechanism 51 also includes a gear shaft 66 that is rotatably mounted by axially spaced thrust bearings 68 within the hollow lower end of actuator shaft 52 for rotation about the axis of shaft 52. A spur gear 70 is secured to the lower end of shaft 66. A second or ballscrew shaft 72 is mounted by sleeve bearings 74 within axially spaced radially outwardly extending arms 76 integral with body 50. Shaft 72 is rotatably mounted on bracket 56 by a thrust bearing 78, and is rotatably mounted in a manifold bracket 80 by a thrust bearing 82. Manifold bracket 80 encircles the lower ends of both shafts 72, 66, and includes suitable fittings 84 for connection to a source of tooling coolant. Shaft 72 has a section 86 disposed between arms 76 having a spiral ballscrew slot encircled by a ballnut 88. Ballnut 88 is coupled to a ballnut actuator 90, which is secured to a pair of laterally spaced shafts 92 that are mounted by linear bushings 94 in arms 76. A cam roller 96 is mounted on ballnut actuator 90, and is disposed within the slot 98 of a cam 100. Thus, ballnut actuator 90 and ballnut 88 move axially with respect to housing 50 under control of cam 100. Motion of ballnut 88 relative to ballscrew section 86 rotates shaft 72 about its axis, which is parallel to the axis of actuator shaft 52. The lower end of shaft 72 is coupled by a spur gear 102 to spur gear 70 on shaft 66. Thus, axial motion of ballnut actuator 90 relative to shaft 72 causes rotation of shaft 66 about its axis. Cams 62, 64 and 100 are mounted in fixed position on the turret frame.

Figure 4:
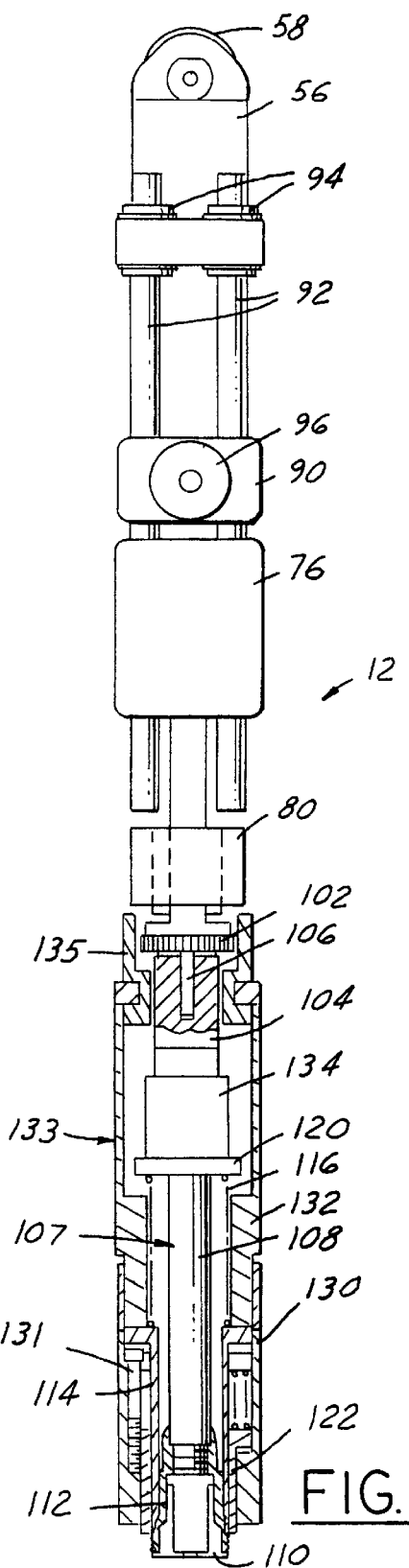
FIG. 4 is a side elevational view of the first mold assembly illustrated in FIG. 3.
Figure 7:
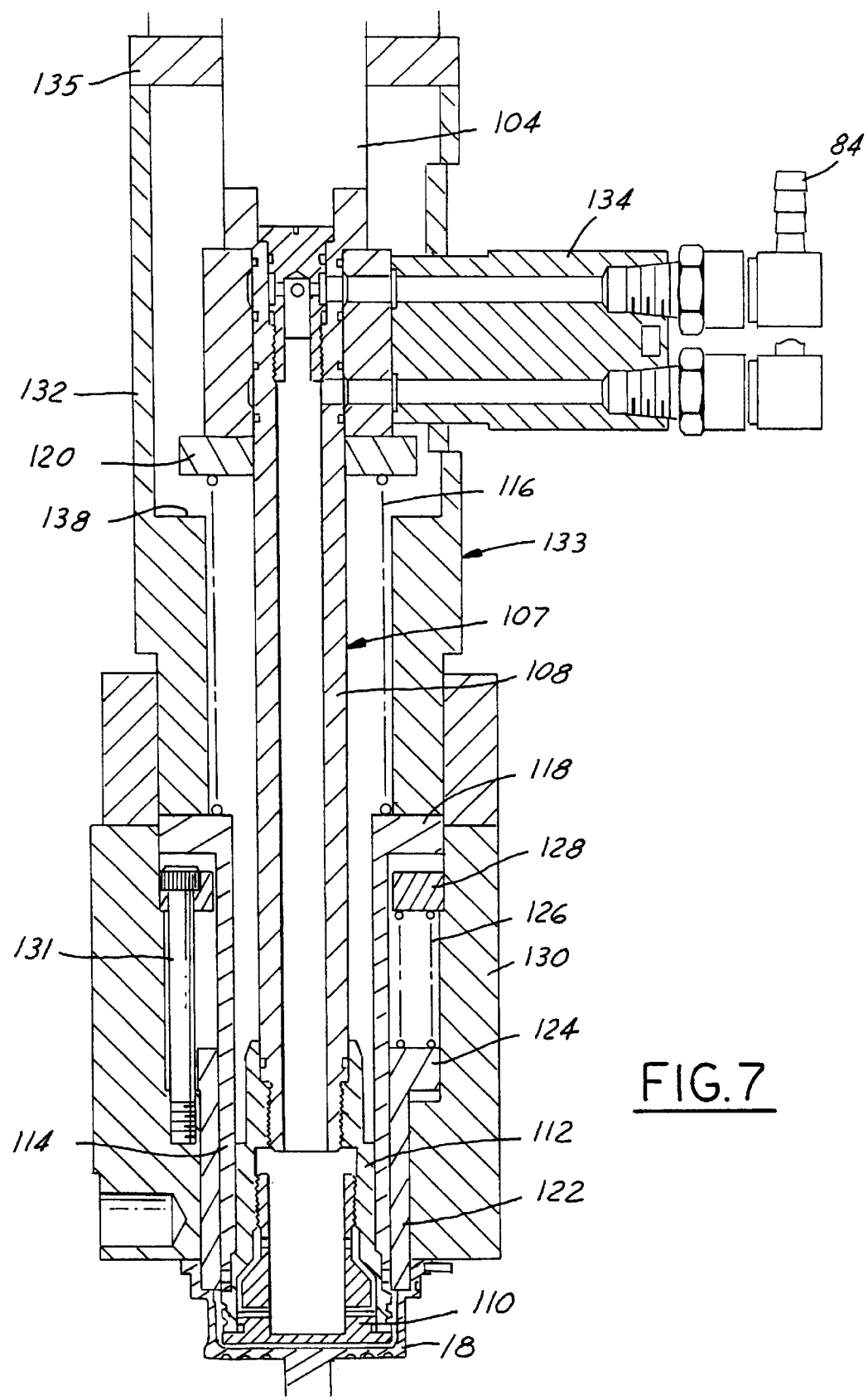
FIG. 7 is a fragmentary sectional view on an enlarged scale of the lower portion of the upper tool assembly in FIGS. 1 and 2.

The lower end of shaft 66 is coupled by a drive slot 104 and a drive tenon 106 (FIG. 4) to a core assembly 107. Core assembly 107 includes an inner core sleeve 108 (FIGS. 3, 4 and 7), a core bushing 112 secured to an end of inner core sleeve 108, and a mold core 110 secured to an end of core bushing 112. Core assembly 107 moves as a unit under control of drive slot 104, both axially under control of shaft 52 and rotationally under control of shafts 66, 72. Drive slot 104 and tenon 106 accommodate a small amount of axial movement between shaft 66 and core assembly 107. An outer core sleeve 114 surrounds sleeve 108, and core assembly 107 is urged upwardly relative to outer core sleeve 114 by a coil spring 116 captured in compression between a thrust race 120 and an upper flange 118 on core sleeve 114. A stripper 122 has a flange 124 engaged by a plurality of coil springs 126 that are captured in compression between flange 124 and a spring retainer 128. Springs 126, retainer 128, sleeve 118 and stripper 122 are surrounded by a tool body 130, with retainer 128 being attached to body 130 by bolts 131. A sleeve 132 is secured to core sleeve 114 to form a core sleeve assembly 133 that is slidable within body 130. A bracket 135 on core sleeve assembly 133 surrounds drive slot 104. Manifold bracket 80 is laterally slidably secured to bracket 135. A coolant manifold 134 has fittings 84 for circulation of coolant through core assembly 107. Thrust race 120 is held in contact with manifold 134 by spring 116, and slidably surrounds sleeve 108 of core assembly 107.

Figure 6A:
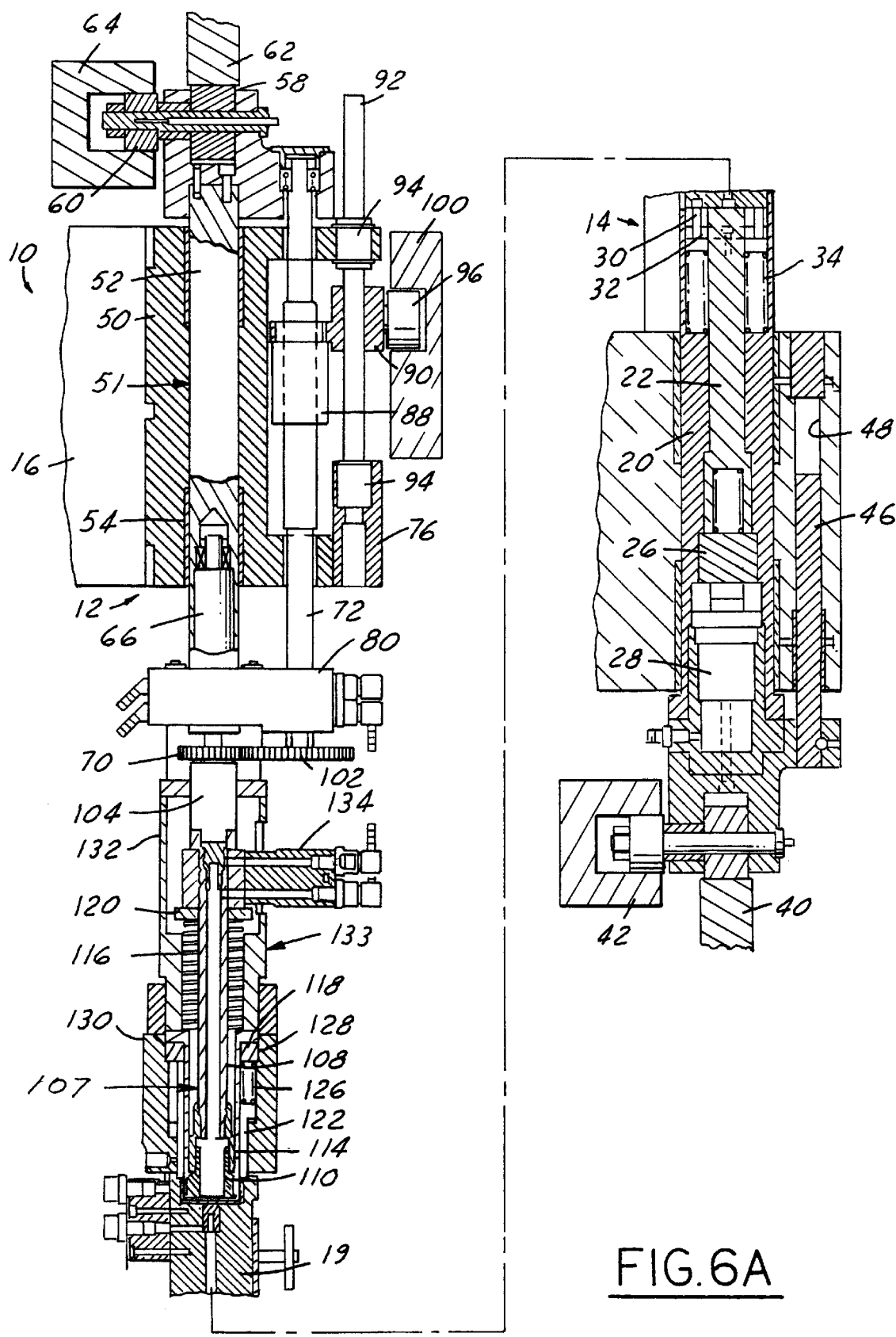
FIGS. 6A–6E are sectioned elevational views that illustrate the apparatus of the invention, particularly the first or upper mold assembly, in sequential stages of operation.

In operation, with the mold assemblies spaced from each other in the position of FIG. 1, a charge of molten plastic material is delivered to female mold cavity 18. The preferred structure for delivering molten plastic charges to the open female mold cavities is illustrated in U.S. Pat. No. 5,603,964, the disclosure of which is incorporated herein by reference. Continued rotation of turret 16 brings the first and second mold assemblies from the fully open position of FIG. 1 to the fully closed position of FIGS. 2 and 6A by operation of rollers 36, 58 and cams 40, 62. Mold core assembly 107 (comprising inner core sleeve 108, core bushing 112 and mold core 110) is driven downwardly by cam 62, shaft mechanism 51 (comprising shafts 52, 66) and core sleeve assembly 133 (comprising core sleeve 132, sleeve 114 and bracket 135). In this closed position, the closure is molded and allowed partially to cure, as disclosed in referenced U.S. Pat. No. 5,554,327. Mold core 110 and core sleeve 114 are in the fully lowered position, with flange 118 of core sleeve 114 adjacent to stripper spring retainer 128. Lower mold assembly 14 is fully raised, and cavity springs 34 are compressed.

Figure 5:
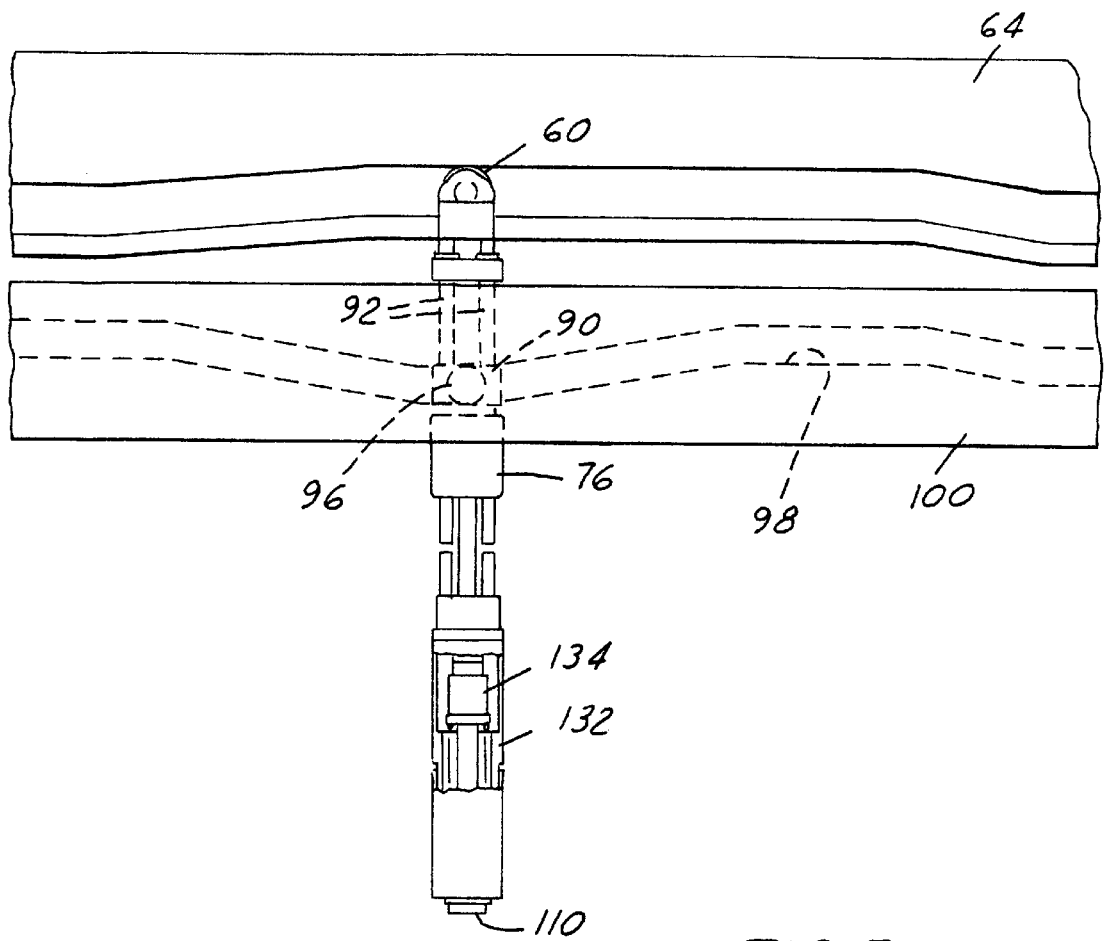
FIG. 5 is a fragmentary elevational view of cams for operating the first mold assembly illustrated in FIGS. 1–4.
Figure 6B:
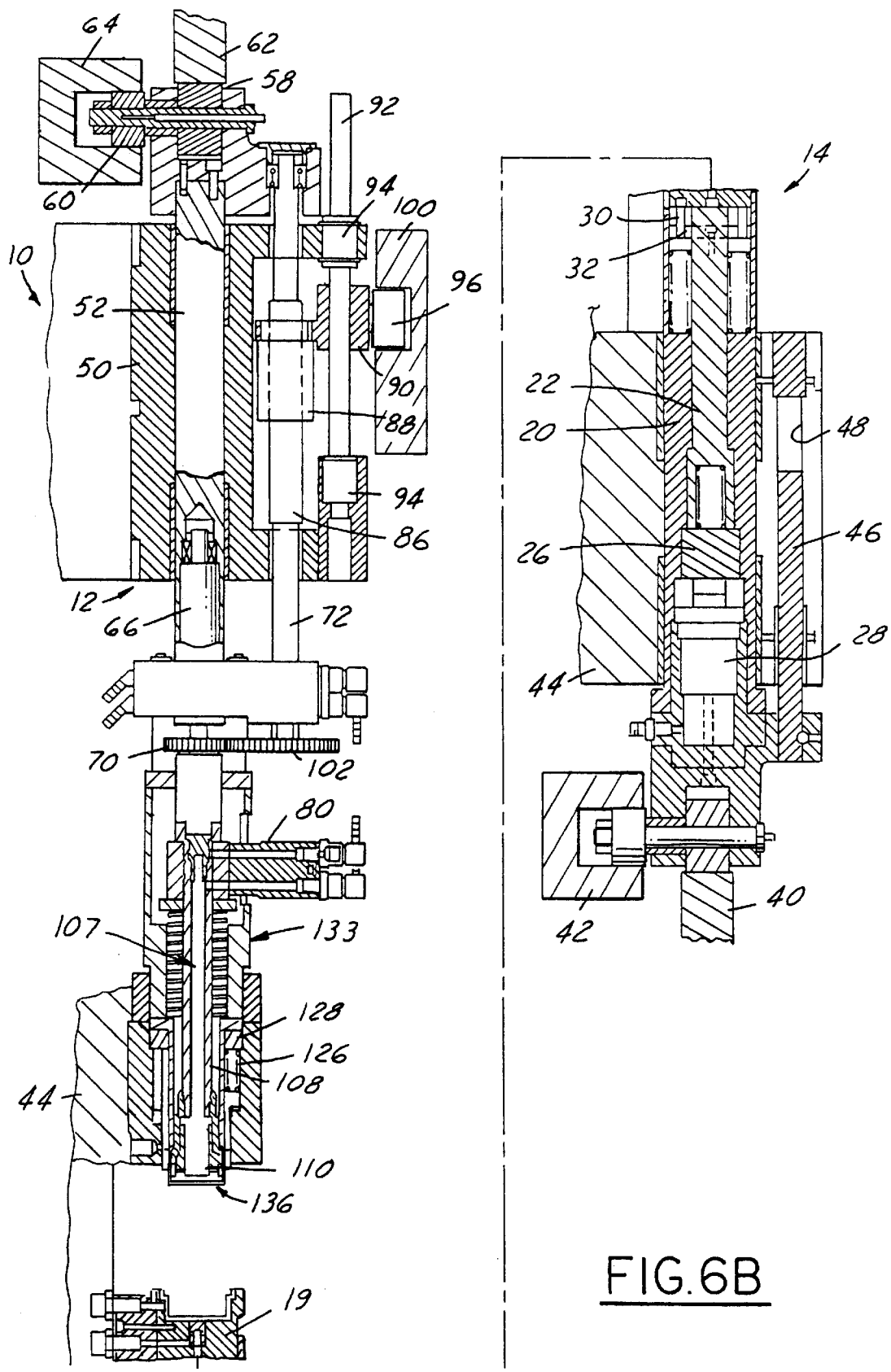

Lower mold assembly 114 is then retracted to the lowered position of FIGS. 1 and 6B by operation of roller 38 and cam 42. At this point, the molded closure 136 is held on core 110 by the internal thread or threads molded onto the closure being still engaged with the corresponding grooves on the core. Sleeve 114 will have moved down to its lower stop position, and the closure will remain on the core engaged by the core threads and under the force control of core spring 116. Compression of spring 116 causes a small separation between core 110 and core sleeve 114. Ballnut 88 moves upwardly synchronously with upward retraction of mold core assembly 117. As retraction continues from the position of FIG. 6B to that of FIG. 6C, and upper mold assembly 12 continues to move upwardly under control of cam 64 and roller 60 (FIG. 3), shoulder 138 on connecting sleeve 132 engages thrust race 120. At this point, there is an overwhelming force exerted on core assembly 107 through thrust race 120 and bushing 134, which retracts core 110 in unison with upper mold assembly 12. However, cam track 98 of cam 100 (FIGS. 3 and 5) moves ballnut actuator 90 and ballnut 88 downwardly relative to body 50, thereby imparting rotary motion to shafts 72 and 66, slot 104, tenon 106 and core assembly 107, rotating core 110 in a direction to unthread from closure 136. Selection of a profile for cam track 98, in conjunction with cam 64, can add to or subtract from rotation of ballscrew shaft 72. Stated differently, ballscrew actuator 90 could be held in fixed position on turret 16, so that core 110 would be rotated in one direction as it is lowered and in the other direction as it is raised. However, cam 100 and track 98 provide additional flexibility for tailoring the rotation of the mold core. By selecting the profile of cam 100, a condition can be established during unscrewing such that the unscrewing rate maintains the condition whereby the mold core assembly remains axially separated from the core sleeve, but shoulder 138 does not contact thrust race 120 until the closure is unscrewed and ready to be ejected. This motion control ensures that the closure is unscrewed with the substantially controlled axial force of the core spring, maintaining the closure in engagement with the stripper and ensuring that the stripper remains in engagement with the closure skirt, effectively resisting rotation of the closure during unscrewing and allowing final ejection of the closure after unscrewing is completed. Thus, in FIG. 6C, closure 136 is partially ejected, and in FIGS. 6D and 6E, the closure is fully ejected from core 110.

Figures 6C, 6D:
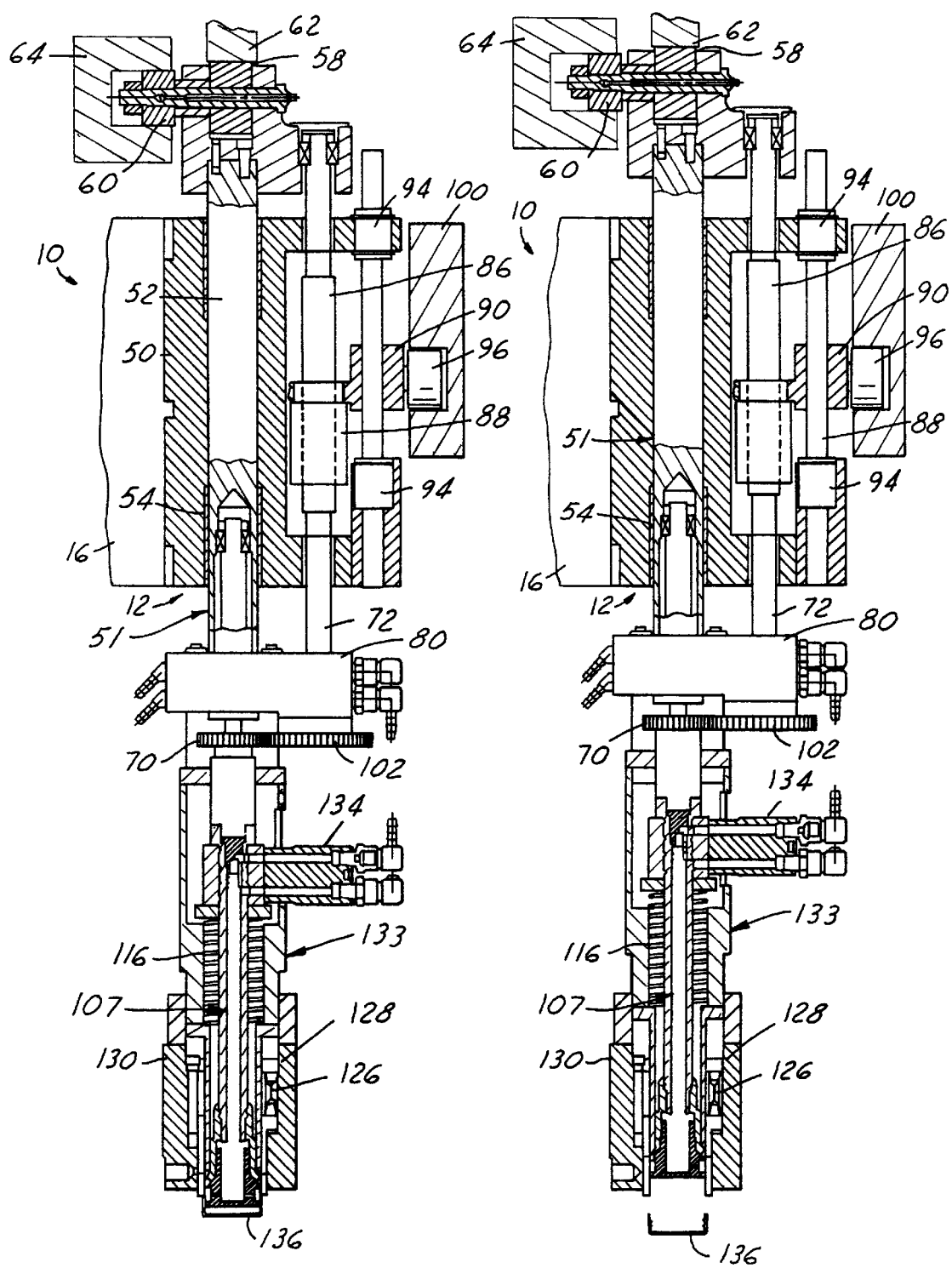
Figure 6E:
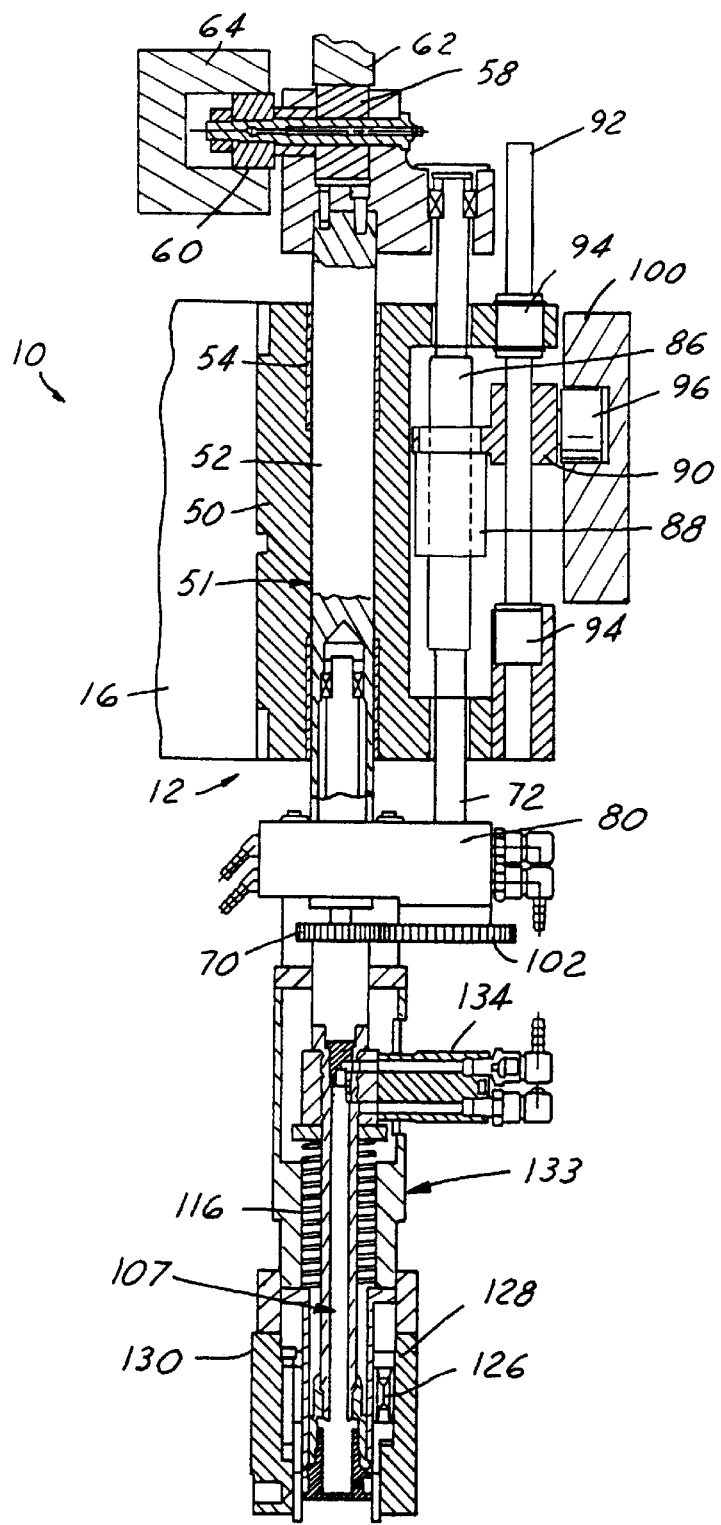

Due to tolerance variations in the manufacture and assembly of apparatus 10, there will be variation in the timing of retraction of core 110 and rotational position of core 110. This variation is accommodated by core spring 116 and the axial separation of core 110 from core sleeve 118 (FIGS. 6B and 6C). As soon as the unscrewing is completed to the extent that the closures is ready to be ejected, cam 100 raises ballnut actuator 90 to the reset position of the ballnut in its upper position of FIG. 6A. This upper position is high enough that the remaining downward travel of the ballnut (FIGS. 6B to 6D) is sufficient to complete the unscrewing function. Cam 100 preferably is profiled such that the ballnut would move down synchronously with the ball shaft and thus substantially no rotation of the core would occur during molding. However, slight rotation could be imparted to the core during forming to reduce the effect of "weld fronts" in the molded part, or to impart a spiral flow to the plastic material during molding.

There has thus been disclosed an apparatus and method for molding plastic closures that fully satisfy all of the objects and aims previously set forth. A number of modifications and variations have been disclosed. Other modifications and variations will readily suggest themselves to persons of ordinary skill in the art. For example, intermeshing gears 70, 102 could be replaced by a belt or chain drive. If the closure is molded with a left-hand thread, it may be necessary to increase the length of ballscrew shaft 72 so as to increase the differential speed of the ballnut as the tooling is retracted upwardly. As an alternative, the ballscrew shaft could be changed to one having opposite pitch. The invention is intended to embrace all such modifications and variations as fall within the spirit and broad scope of the appended claims.

What is claimed is:

1. Apparatus for compression molding plastic closures having a base wall and a peripheral skirt with an internal thread, said apparatus comprising:

a first mold assembly having a male mold core, a housing and a first shaft mechanism carried for rotation by said housing, with said male mold core being mounted on an end of said first shaft mechanism, a second mold assembly having a female mold cavity, means for moving at least one of said first and second mold assemblies relative to the other to bring said male mold core into said female mold cavity for compression molding a closure, and then moving said at least one mold assembly relative to the other to open said cavity such that the closure is retained on said male mold core, and means for rotating said male mold core relative to said first mold assembly to unthread said core from the closure, including means for rotating said first shaft mechanism relative to said housing, said means for moving at least one of said first and second mold assemblies including means for moving said first shaft mechanism axially with respect to said housing, and said means for rotating said first shaft mechanism moving axially with said first shaft mechanism relative to said housing, said means for rotating said first shaft mechanism comprising axially spaced brackets coupled to said first shaft mechanism a second shaft rotatably carried by said brackets parallel to said first shaft mechanism, drive means rotatable coupling said second shaft to said first shaft mechanism, and means for controlling rotation of said second shaft, rotation of said second shaft being imparted to said first shaft mechanism by said drive means.

2. The apparatus set forth in claim 1 wherein said second shaft comprises a ballscrew shaft, and wherein said means for controlling rotation of said ballscrew shaft comprises a ballnut actuator.

3. The apparatus set forth in claim 2 wherein said means for controlling rotation of said ballscrew shaft comprises means for controlling position of said ballnut actuator with respect to said housing.

4. The apparatus set forth in claim 3 wherein said means for moving said first shaft mechanism relative to said housing comprises a first fixed cam operatively coupled to said first shaft mechanism for moving said first shaft mechanism axially of said housing, wherein said means for controlling position of said ballnut actuator comprises a second fixed cam operatively coupled to said ballnut actuator, and wherein said apparatus further comprises means for moving said first mold assembly relative to said first and second fixed cams.

5. The apparatus set forth in claim 4 further comprising a third shaft on which said ballnut actuator is mounted for guiding motion of said ballnut actuator.

6. The apparatus set forth in claim 5 comprising a spaced pair of said third shafts.

7. The apparatus set forth in claim 6 wherein said pair of third shafts are slidably mounted to said axially spaced brackets.

8. The apparatus set forth in claim 4 wherein said drive means rotatably coupling said second shaft to said first shaft mechanism comprises intermeshing gears carried by said shafts.

9. The apparatus set forth in claim 4 wherein said first shaft mechanism comprises an outer shaft mounted for axial motion within said housing and an inner shaft coupled to said second shaft and mounted for rotation within said outer shaft.

10. The apparatus set forth in claim 2 wherein said first mold assembly comprises a stripper sleeve for engaging the skirt of a closure on said male mold core and holding the closure against rotation as the mold core is rotated and retracted from the closure.

* * * * *